Patented Dec. 1, 1936

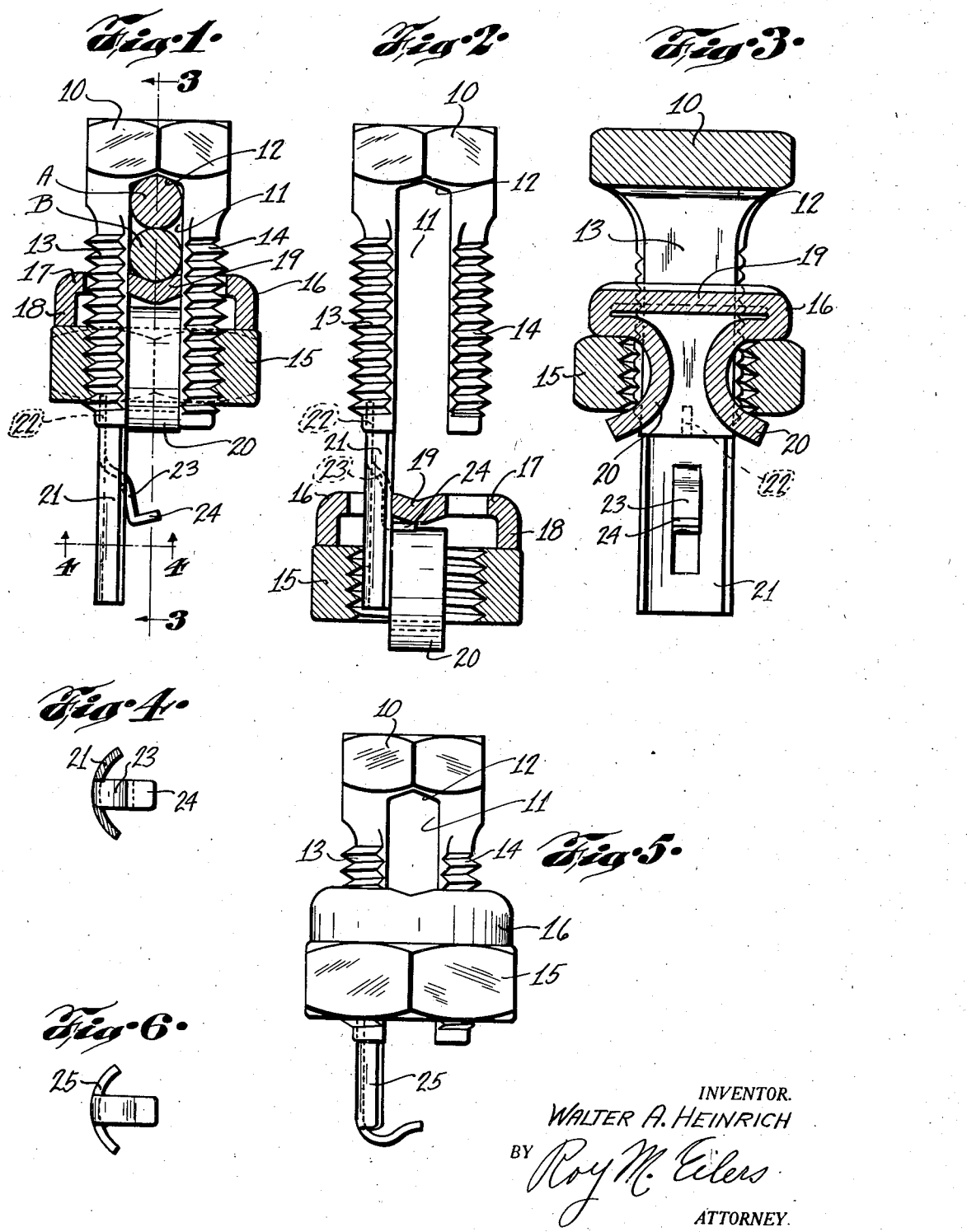

2,062,882

UNITED STATES PATENT OFFICE 2,062,882

ELECTRICAL CONNECTER

Walter A. Heinrich, St. Louis, Mo., assignor to James R. Kearney Corporation, St. Louis, Mo., a corporation of Missouri Application May 10, 1934, Serial No. 724,863

6 Claims. (Cl. 173—263)

An object of my invention is to provide an improved connecter comprising a minimum number of parts, all of which are inseparably associated; which is readily adapted for single-hand application to an overhead or other electrical conductor, and which is especially constructed to facilitate taping or insulating.

These and other objects and advantages will hereinafter appear from the following detailed description and accompanying drawing, Fig. 1 of which is a side elevation showing a presently preferred embodiment of my invention, operatively disposed on a pair of wires which appear in section; Fig. 2 is a sectional elevation of the device of Fig. 1, with the parts in position for application to a conductor; Fig. 3 is a sectional elevation taken at line 3—3 of Fig. 1; Fig. 4 is a transverse section taken at line 4—4 of Fig. 1; Fig. 5 is a side elevation showing a modified form of my invention, and Fig. 6 is a bottom plan view of Fig. 5.

Referring now by characters of reference to the drawing, numeral 10 designates the head portion of a bolt which forms the body of the connecter. The bolt shank is provided with a longitudinal, medial slot 11, extending inwardly from the end of the shank to the under or inner side of the bolt head, the slot terminating in a groove 12 which traverses the under side of the bolt head and provides a seat for a wire, indicated A.

Threaded on the paired shank portions 13 and 14 of the bolt, is a nut 15. The nut 15 carries a washer 16, preferably comprising, in part, an annular portion 17 which surrounds the shanks 13 and 14. The outer margin of portion 17 is turned to provide a skirt 18 which bears edgewise upon the upper face of the nut. Extending diametrally of the annular portion 17, and transversely through the bolt slot 11, is a bridge portion 19, which, by preference, is longitudinally grooved to form a seat for a wire, indicated at B. A pair of fingers 20, connected to the skirt portion of the washer at points adjacent the ends of the bridge 19, project initially inwardly, thence downwardly through the bore of the nut. The free ends of the fingers 20 underlie the lower end-face of the nut and maintain the nut and washer in assembled relation. The bridge 19 and fingers 20 are of width substantially equal to the width of the bolt slot, and accordingly serve as spacers to prevent the shank portions 13 and 14 from being drawn, one toward the other, when the nut is turned up tightly thereon.

As heretofore described, the device is similar to the connecter set forth in U. S. Letters Patent No. 1,943,677 issued to James R. Kearney, January 16, 1934. The description which follows relates to certain improvements in connecters of the character set forth in Patent No. 1,943,677, which render such devices more suitable for use in joining a tap wire to an overhead line. The present invention appertains to a modification of the device described and claimed in my copending application filed May 4, 1934, Serial No. 723,813.

One of the shank portions, designated 13, is provided with an extension 21 which serves to carry the nut and washer assembly when the connecter is prepared for lateral application to a conductor, as shown in Fig. 2. In a presently preferred form, the extension 21 comprises an elongate sheet metal strip, preferably arcuate in transverse section. The extension is secured to the shank portion 13 by means of a finger 22 which projects longitudinally from one end of the strip and fits tightly in a bore formed in the end of the shank portion. A resilient tongue 23, punched from the metal of the strip, projects downwardly and inwardly, terminating in a hook or finger 24 which is adapted to engage the bridge 19 and preclude detachment of the nut and washer assembly from the bolt. When the nut is unthreaded from the shank portions and drawn down on to the extension 21, to provide a lateral opening between the end of shank portion 14 and the upper face of the washer, the resilient tongue 23 will bear laterally against the bridge 19, retarding free movement of the nut assembly along the extension. Accordingly, the connecter will remain in open condition, (Fig. 2), and when applying the connecter to a wire, the operator will not have expressly to hold the device in open position while applying the device.

The advantages derived from the described expedient will be more fully appreciated when it is considered that connecters of split-bolt and nut type are employed to a large extent on overhead lines, as for the purpose of connecting a tap conductor to a main or feeder line. While located on a pole or other support, the lineman customarily holds the tap conductor in one hand and manipulates the connecter device with the other until a preliminary connection is effected. Thereafter a wrench or other suitable tool is applied to the device to complete the connection. The operation is greatly simplified by the connecter of my invention, since the device may be hooked on to a line while held in any convenient position, and without necessitating special preparations on the part of the lineman for holding the device open. By a simple, one-hand operation the nut assembly may be readily displaced from its position of control by the resilient tongue 23, for threaded engagement with the shank portions.

In the embodiment of my invention illustrated in Figs. 5 and 6 of the drawing, the device is similar, with the exception of the extension 25, to the device illustrated in Fig. 1. Like the extension 21, the member 25 is preferably formed of strip or sheet metal, arcuate in transverse section, and is preferably secured to one shank portion by means of a projecting finger, snugly received by a bore in one shank portion. A laterally projecting tongue is provided at the lower end of the extension, which is adapted to engage the bridge 19 to prevent disassociation of the nut and washer assembly from the bolt. In the embodiment shown in Fig. 5, unintended movement of the nut assembly along the extension may be retarded, (for purposes explained in connection with the embodiment of Fig. 1), by forces exerted on the nut or washer due to the lateral resiliency of the extension 25. Thus the extension may be so dimensioned that the washer, when disposed thereon, will tend to constrict, or increase the transverse curvature of the extension.

It is customary, in certain installations, to insulate the connection as by wrapping with electricians' tape. For the purpose of providing a more compact structure, so as to facilitate the taping operation, the extension 21 or 25 is susceptible of being broken off, or otherwise removed from the connecter bolt, which may be resorted to after the connecting operation has been completed.

Having described my invention with reference to several preferred embodiments thereof, it will appear that various changes and modifications may be made in the means herein shown and described without departing from the spirit and scope of the invention as defined by the following claims.

I claim:

1. In an electrical connecter, a threaded body member having laterally spaced shank portions, one of said shank portions having an extension projecting a substantial distance beyond the end of the other, a nut normally threaded on the body member, adapted to be carried by said extension when free of the body member and resilient means on said extension adapted to retard free longitudinal movement of said nut along said extension.

2. In an electrical connecter, including a slotted bolt, a nut assembly including a nut and a washer carried by said bolt, a sheet metal strip of arcuate transverse section connected to one shank portion of the slotted bolt for carrying the nut assembly when free of the bolt, and a resilient tongue struck from the metal of said strip, engageable with said washer for restricting free movement of the nut assembly along said strip.

3. In an electrical connecter, a body member having threaded, laterally spaced shanks, a nut threaded on said shanks, an element carried by the nut having a portion thereof disposed between said shanks, an extension on one of said shanks adapted to receive the nut assembly, and a resilient tongue associated with said extension and cooperable with said element to retard free longitudinal movement of the nut assembly relative to the extension, and to prevent disassociation of the body member and nut assembly.

4. In an electrical connecter, including a longitudinally slotted bolt and a nut and washer assembly normally disposed on the bolt, an extension on one leg portion of the bolt for carrying the nut and washer assembly when free of the bolt, said extension comprising a strip of resilient metal of arcuate transverse section adapted frictionally to engage said washer in a manner to restrict free movement of the nut and washer assembly along said extension.

5. In an electrical connecter, a body member having threaded, laterally spaced shanks, a nut threaded on said shanks, an element carried by the nut having a part thereof disposed between said shanks, an extension on one of said shanks adapted to receive the nut assembly when unthreaded from the body member, said extension having a yieldable portion extended therefrom adapted frictionally to engage, and retard free longitudinal movement of the nut assembly along said extension.

6. In an electrical connecter, a bolt having a bifurcated shank, a nut normally threaded on said shank, and a washer element carried by said nut, said washer having a portion thereof extending between the furcations of the bolt shank, an extension on one shank furcation adapted to carry the nut assembly when free of the bolt, and a yieldable tongue on said extension engageable with said washer portion for restricting free movement of the nut assembly along said extension.

WALTER A. HEINRICH.